(12) United States Patent
Demopoulos et al.

(10) Patent No.: US 6,529,283 B1
(45) Date of Patent: Mar. 4, 2003

(54) METHOD FOR MEASURING THE WIDTH OF A GAP

(75) Inventors: Andreas Demopoulos, Leighton Buzzard (GB); Charalambos Tassakos, Würselen (DE)

(73) Assignee: inos Automationssoftware GmbH, Herrenberg (DE)

( * ) Notice: Subject to any disclaimer, the term of this patent is extended or adjusted under 35 U.S.C. 154(b) by 0 days.

(21) Appl. No.: 09/573,215

(22) Filed: May 19, 2000

Related U.S. Application Data

(63) Continuation of application No. PCT/EP00/02108, filed on Mar. 10, 2000.

(30) Foreign Application Priority Data

Mar. 10, 1999 (DE) .......................................... 199 10 699

(51) Int. Cl.⁷ ............................................. G01B 11/02
(52) U.S. Cl. ...................... 356/635; 356/606; 356/623
(58) Field of Search ................................ 356/601, 602, 356/603, 612, 614, 622, 623, 625, 631, 635, 636, 640, 606; 250/559.24, 559.2, 559.23, 559.29

(56) References Cited

U.S. PATENT DOCUMENTS

| | | | | |
|---|---|---|---|---|
| 4,498,776 A | * | 2/1985 | Smith | .......................... 356/375 |
| 4,541,721 A | * | 9/1985 | Dewar | .......................... 356/375 |
| 4,666,303 A | * | 5/1987 | Pryor | .......................... 356/375 |
| 5,129,010 A | * | 7/1992 | Higuchi et al. | ................. 382/8 |
| 5,416,590 A | * | 5/1995 | Stover et al. | ................ 356/375 |
| 5,999,265 A | * | 12/1999 | Dalancon et al. | ............ 356/375 |

* cited by examiner

*Primary Examiner*—Hoa Q. Pham
(74) *Attorney, Agent, or Firm*—Paul Vincent

(57) ABSTRACT

The invention concerns a device (8) for measuring the width (b) of a gap (2) between two structural parts (3), wherein the gap (2) is delimited by edges (17) of the structural parts (3). The device comprises an illumination component (9) for illuminating the structural parts (3), a detection component (10) for detecting reflections caused by the illumination component (9) on the structural parts (3) in the area of the gap (2), and an evaluation component (19) for evaluating the detected reflections and for determining the width (b) of the gap (2). To measure the width (b) of the gap (2) in a simple, reliable, accurate, and reproducible fashion independently of the surface finish of the structural parts (3), the illumination component (9) and the detection component (10) are arranged and oriented relative to one another and relative to the gap (2) such that the detection component (9) detects line-shaped reflections at the edges (17) of the structural parts (3) delimiting the gap (2).

41 Claims, 3 Drawing Sheets

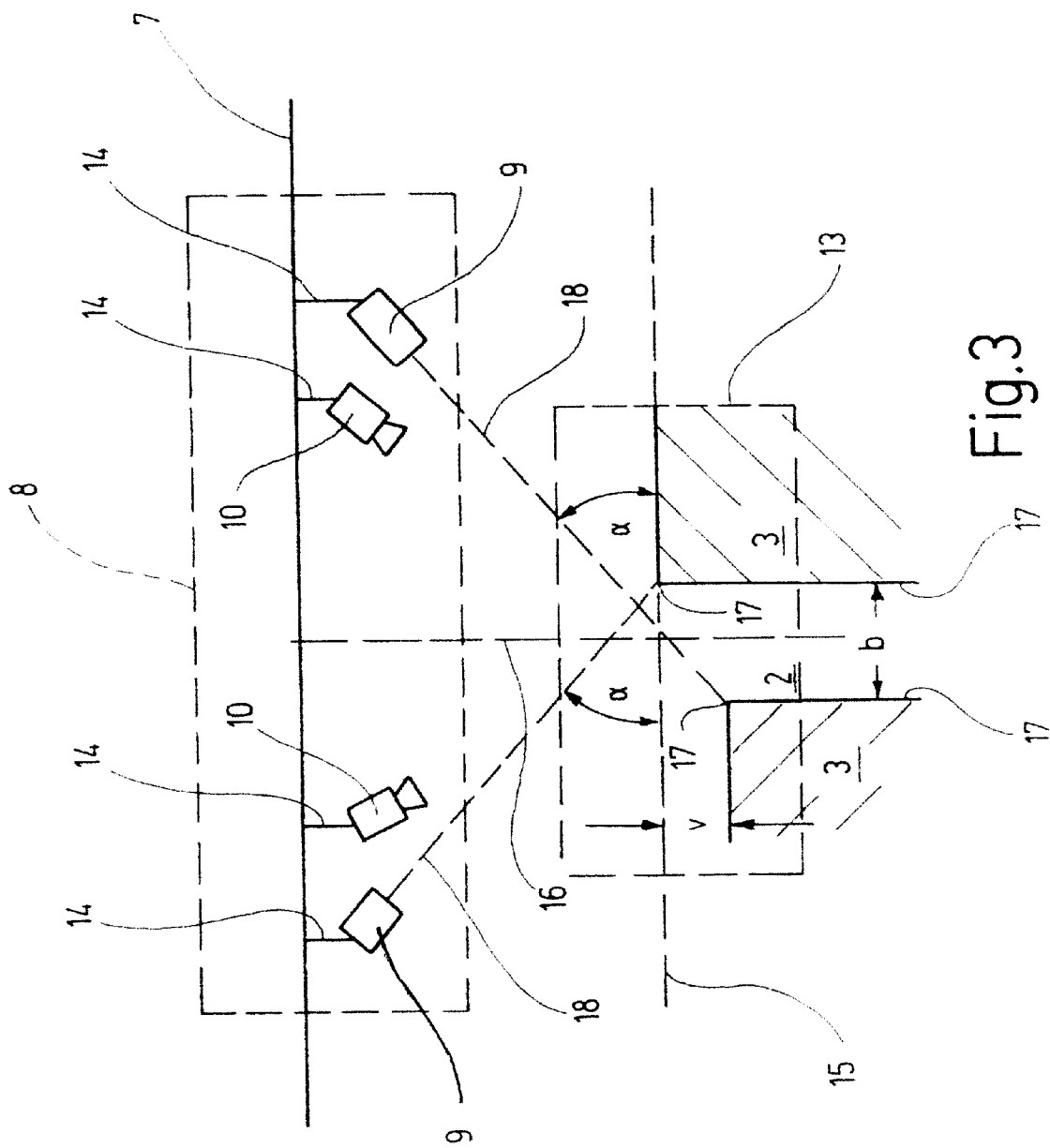

METHOD FOR MEASURING THE WIDTH OF A GAP

This application is a continuation of PCT/EP00/02108 filed Mar. 10, 2000 claiming Paris Convention priority of DE 199 10 699 filed Mar. 10, 1999 the complete disclosure of which are hereby incorporated by reference.

BACKGROUND OF THE INVENTION

The present invention concerns a device for measuring the gap width between two structural components, wherein the gap is delimited by the edges of the structural components, comprising illumination means for illuminating the structural components;

detection means for detecting reflections from the structural components in the area of the gap caused by the illumination means; and evaluation means for evaluating the detected reflections and for determining the width of the gap.

The invention also concerns a gap measuring arrangement for measuring the width of gaps between the leaves or the rest of the body of a vehicle, wherein the gaps are limited by edges of the leaves and/or the rest of the body.

Finally, the invention concerns a method for measuring the gap width between two structural components, the gap being delimited by the edges of the structural components, wherein the structural components are illuminated by illumination means;

the reflections, generated by the illumination means on the structural components in the area of the gap are detected;

the detected reflections are evaluated and the width of the gap is determined.

Devices of the above mentioned kind are used in various fields. Such devices are widely used e.g. in the automotive industry for measuring the width of gaps between the leaves or the rest of the body of a vehicle. The gaps are delimited either from both sides by edges of the leaves or from one side by an edge of a leaf and by the rest of the body at the other side. In the following, leaves designate parts of the body of a vehicle hinged in a pivotable fashion to the rest of the body. In the case of an automotive vehicle, these are, in particular, the doors, the hood and the trunk.

During manufacture of a vehicle, the correct position and location of the leaves relative to the rest of the body is checked several times. Directly after mounting of the leaves, one examines e.g. whether or not the leaves are properly fitted to the rest of the body. The first check is performed before the body is painted. Depending on the material from which the body is made, the body has a mat, untreated steel, aluminium or plastic surface. These different surface materials have widely varying reflection characteristics. The normally mat body surface reflects light poorly.

During final inspection of the vehicle, the gap width between the leaves or the rest of the body is again examined at a plurality of measuring points. For this final examination, the body has been painted. Depending on the color of the paint, the body surface has differing reflection properties.

Various conventional devices and methods have been used for measuring the gap width. Due to their easy handling and high measurement speed, feeler gauges of differing widths have become established in the automotive industry. By inserting various feeler gauges into the gap, that feeler gauge is determined which precisely fits into the gap. From the width of this feeler gauge, one obtains the width of the gap. The measurement results which can be achieved with this method, are not very accurate. With gap widths in the range of less than 10 mm, the measurement result depends e.g. on the angle at which the feeler gauge is introduced into the gap.

Moreover, the measurement results which can be achieved with this method are not reproducible. With this method, different individuals obtain different measurement results for the same gap. Different automotive vehicle manufacturers measure the gap width of their vehicles at different measuring points and in different ways. For this reason, different automotive vehicle manufacturers may obtain completely different measurement results for identical gap widths. The measurement value of the gap width between the leaves or the rest of the body obtained with the conventional method can therefore not be used as a comparative value for assessment of the production qualities of various automobile manufacturers.

Prior art discloses a further method of measuring the gap width between two structural components, referred to as edge detection, wherein the gap is delimited by the edges of the structural components. In this method, illumination means illuminate the structural components in the area of the gap. Illumination of the structural components causes strong surface reflections on the surfaces of the structural components. The gap absorbs the light emitted by the illumination means. Detection means detect the light/dark transition on one side of the gap and the dark/light transition on the other side of the gap. Evaluation means evaluate the detected reflections and determine the width of the gap.

This conventional method can function with sufficient accuracy only if the light/dark transition or the dark/light transition is clearly visible and can be clearly detected by the detection means. This requires relatively good reflection properties of the surfaces of the structural components. Such good reflection properties can only be effected by very smooth surfaces. Reflections from untreated metal surfaces are too weak for this method. Towards this end, the edge detection method cannot be used for checking proper fitting of the leaves to the rest of the body.

In addition, the surfaces have different reflection properties in dependence on their color. The conventional edge detection method thereby produces different measurement results for the same gap width, in dependence on the color of the surface of the structural components defining the gap. Since vehicle body are painted in a large number of different colors, the conventional edge detection method cannot be used in the automotive industry for final inspection to check the width of gaps between the leaves and the rest of the body parts of a vehicle.

It is therefore the underlying purpose of the present invention to design and further develop a device of the above mentioned kind in such a manner that the gap width between two structural components can be measured in a simple, reliable, accurate, and reproducible manner independently of the surface finish of the structural components.

SUMMARY OF THE INVENTION

Departing from the device of the above mentioned kind, this object is achieved in accordance with the invention by disposing and orienting the illumination means and the detection means relative to one another and relative to the gap such that the detection means detect line-shaped reflections on the edges of the structural components delimiting the gap.

With the device in accordance with the invention, the line-shaped reflections are detected at the edges of the structural components delimiting the gap. The illumination means must therefore be disposed and oriented relative to the gap in such a manner, that at least part of the light beams emitted by the illumination means is reflected as line-shaped reflections at the edges of the structural components. The detection means must be disposed and oriented relative to the gap such that they can detect these line-shaped reflections. In addition, the illumination means and the detection means must be disposed relative to the structural components in such a manner that the detection means do not detect a virtual reflected image of the illumination means.

The detection means detect the line-shaped reflections at the edges of the structural components. More precisely, they detect a dark/light/dark transition between the structural component (dark), the line-shaped reflection (light), and the gap (dark), or vice versa. The line-shaped reflections are generated at edges having an edge radius which may be very small. The line-shaped reflections occur even with relatively sharp-edged edges. The line-shaped reflections also occur for relatively poorly reflecting surfaces such as mat untreated metal surfaces. The position of the line-shaped reflections at the edges does not depend on the reflection properties of the surface.

The device in accordance with the invention permits measurement of the gap width between two structural components in a simple, reliable, precise and reproducible manner. It is particularly suited for use in the automotive industry for measurement of the width of gaps between leaves or the rest of the body of a vehicle. The device in accordance with the invention provides measuring results of high accuracy, independent of the color of the body. It can be easily used to check proper fitting of the leaves into the rest of the body or for a final check of the gap width between the leaves and the rest of the body parts of a vehicle.

In addition to measurement of the gap width and of the mismatch between the structural components defining the gap, the device in accordance with the invention can also measure the travel of a gap. Since the device in accordance with the invention effects measurements using elongated reflections along the edges of the structural components defining the gap, the gap width can be measured at various measurement points along the elongated reflections. The travel of the gap can then be determined from the discrete measurement points.

The device in accordance with the invention uses elongated reflections at the edges of the structural components defining the gap. These reflections are caused by the light beams emitted by the illumination means. One can, however, also use illumination means having elongated light sources which are reflected at the edges. In this case, the elongated reflections received by the detection means represent the reflected image of the illumination means at the edges of the structural components defining the gap.

In accordance with an advantageous further development of the present invention, the illumination means are oriented relative to the gap such that the light beams of the illumination means impinge on the edges of the structural components at an angle of <90° with respect to an imaginary tangential plane, extending along the gap of the structural components, in particular at an angle of between 30 to 60 degrees. It has turned out that particularly accurate measurement results can be achieved if the illumination means are oriented with respect to the gap in such a manner that the light beams impinge on the edges at an angle of approximately 45° with respect to the tangential plane.

To guarantee uniform illumination of the two edges defining the gap, a preferred embodiment proposes that each illumination means illuminates the edge disposed on the other side of an imaginary normal plane extending orthogonally to the tangential plane and through the gap. In this manner, the illumination means illuminate the edges in a cross-wise manner. The illumination means on the left-hand side of the normal plane illuminate the edge on the right-hand side and the illumination means on the right-hand side illuminate the edges on the left-hand side of the normal plane.

Advantageously, the illumination means comprise at least two light sources of which at least one is disposed on one side of the normal plane and at least one on the other side of the normal plane.

In accordance with a preferred embodiment of the present invention, the or each light source comprises at least one light emitting diode (LED). LEDs have the advantage that they are very small, have a relatively large illumination strength and exhaust very little heat during operation.

In an advantageous manner, the or each light source comprises several LEDs disposed in at least one row. The or each light source advantageously comprises several rows of LEDs, wherein the LEDs are disposed in a row offset to the LEDs of a neighboring row. This ensures that the LEDs generate a line-shaped reflection at the edges of the structural components and not a sequence of several dot-shaped reflections.

In a preferred embodiment of the present invention, the illumination means emit light in the infrared (IR) range. This light is not visible to the human eye. The illumination means comprise appropriate display means to indicate operation and proper function of the illumination means. These display means constitute e.g. LEDs of different colors or a liquid crystal display (LCD).

In an advantageous further development of the invention, the illumination means emit light pulsed at a certain pulse cycle rate to facilitate proper operation of the inventive device irrespective of ambient light conditions (e.g. sunlight or artificial light in buildings). The detection means also receive the line-shaped reflections at the edges of the structural components at a certain pulse cycle rate. Advantageously, the illumination means and the detection means operate at the same, synchronized pulse cycle rate.

In an additional advantageous embodiment of the invention, the detection means are oriented relative to the gap such that the detection means view the edges of the structural components at an angle of <90° with respect to the imaginary tangential plane, in particular at an angle of 30 to 60°. It has turned out that particularly precise measurement results can be achieved by orientation of the detection means relative to the gap such that the edges are viewed at an angle of approximately 45° with respect to the tangential plane.

In accordance with a preferred embodiment of the invention, the detection means comprise at least two video cameras of which at least one is disposed on one side of the normal plane and at least one on the other side of the normal plane. Video camera arrangement of this kind permits reliable measurement of the width of the gap, largely independent of the surface quality of the structural components.

Advantageously, the or each video camera comprises a charge-coupled device (CCD) image converter. Alternatively, video cameras with CMOS (complementary metal oxide semiconductor) image converters can also be used.

In order to carry out three-dimensional measurements of the transition from one structural component to the neighboring structural component, a preferred embodiment proposes that the detection means comprise two video cameras, wherein the evaluation means combine the images of the video camera to form a three-dimensional image. Each video camera records a two-dimensional image. The evaluation means can combine the two two-dimensional images into a three-dimensional image when the exact position and orientation of the two video cameras is known. For correct superposition, previous calibration of the video cameras has to be carried out. This can be effected e.g. using a known calibration object. The three-dimensional image can be used to also measure the offset of the two structural components in addition to the width of the gap between the two structural components. In the context of the invention, offset refers to the height difference between the surfaces of the two structural components in the gap region.

The evaluation means is preferably a computer, in particular an industrial PC. The computer can assume process control of the entire gap measurement and appropriately control the illumination means and the detection means. For integration of the device in accordance with the invention into a higher ranking device, the computer can receive appropriate control commands from a higher ranking control unit, e.g. for starting gap measurement at a certain point in time.

Measurement of the width of the gap by the device is preferably effected in real time.

The illumination means and at least two video cameras can be combined into a measuring head arrangement. The illumination means and the video cameras are mounted within the measuring head arrangement and oriented for a fixed, delimited measuring range. The measuring range comprises a three-dimensional measuring volume, in which the measuring head arrangement can carry out measurement with maximum accuracy or in which measurement is generally possible. It is e.g. feasible that the video cameras cannot thereby detect any line-shaped reflections on the edges of a gap located outside of the measuring range.

The measuring head arrangement must only be positioned and oriented such that the gap to be measured is within the predetermined measuring range of the measuring head arrangement. Such a measuring head arrangement is particularly easy to handle when it constitutes one single unit. The entire measuring head arrangement can be mounted on a robot arm and moved by the robot to a certain position and location so that the gap to be measured is within the measurement range. A measuring head arrangement can also be a hand-held device which can be manually positioned by a user into a certain orientation and location such that the gap to be measured is within the measuring range of the measuring head arrangement.

The device advantageously comprises means for changing the position and/or the location of the illumination means and the video cameras relative to the gap and means for fixing the illumination means and the video cameras at a certain position or location. These means may e.g. constitute a manually adjustable hinged arm with at least six different positions.

In accordance with a particularly preferred embodiment of the present invention, the device is a gap measuring device for measuring the gap width between the leaves or the rest of the body of a vehicle.

A further object of the present invention concerns the construction and development of a gap measuring arrangement of the above mentioned kind, wherein the gap width between the leaves or the rest of the body of a vehicle can be measured in a simple, reliable, precise, reproducible manner and independently of the surface finish of the body.

In achieving this object, the invention departs from the gap measuring arrangement of the above mentioned kind such that the gap measuring arrangement comprises several devices arranged about the vehicle and oriented towards the gaps at predetermined positions and locations. The gap measuring arrangement in accordance with the invention permits measurement of the gap width between the leaves or the rest of the body of a vehicle, independent of the surface finish of the body. The gap measuring arrangement provides reliable and exact measuring results, independent of whether the surfaces of the body are untreated and mat or painted, and independent of the color of the surfaces.

In an advantageous further development of the present invention, the devices are disposed inside of a tunnel-like supporting frame. The supporting frame is at least large enough to receive part of a vehicle. The supporting frame comprises curved supporting elements and transverse beams releasably mounted thereon. The devices are preferably mounted to the transverse beams and can be easily removed, together with the transverse beams, from and re-inserted into the supporting frame. The releasable connections between the transverse beams and the supporting elements are formed such that the transverse beams automatically assume their position relative to the supporting elements during insertion into the supporting frame. The positioning accuracy is a few millimeters, preferably less than one millimeter. The gap measurements are carried out with the vehicle disposed within the supporting frame.

Advantageously, there may be relative motion between the vehicle and the devices. The vehicles on production lines are guided through the supporting frame. The devices inside of the supporting frame either follow the motion of the vehicles, at least for a certain period of time, or are stationary and carry out the gap measurements when the corresponding gap of the vehicle is within the fixed measuring range of a device.

In accordance with a preferred embodiment of the invention, the devices remain stationary on the supporting frame and the vehicle moves through the supporting frame.

Advantageously, at least one device sequentially measures the width of at least two gaps. In this manner, the number of required devices can be reduced for a given number of measuring points at which the gap width is to be measured.

The evaluation means of several devices are preferably combined into a common evaluation unit to reduce the number of evaluation means for the inventive gap measuring arrangement.

The position of the devices within the supporting frame is preferably selected such that a gap of at least 30 centimeters, preferably approximately 50 centimeters, remains between the vehicle and the devices to prevent clamping of persons or body parts between the devices and the vehicle moved through the supporting frame.

A further object of the present invention is to design and further develop a method of the above mentioned kind such that the gap width between two structural components can be measured in a simple, reliable, exact, and reproducible fashion, independent of the surface finish of the structural components.

In achieving this object, the invention departs from a method of the above mentioned kind by detecting line-shaped reflections at the edges of the structural components and by detecting the gap width by evaluation of the detected reflections.

A dark/light/dark transition between the line-shaped reflections at the edges of the structural components defining the gap is advantageously detected.

In an advantageous further development of the invention, mismatch between two structural components is detected. Mismatch refers to the height difference between the surfaces of the two structural components with respect to one another in the region of the gap.

The width of the gap and/or the mismatch is advantageously measured in real time. The measurement of the width of the gap and/or of the mismatch comprises detection of the line-shaped reflections by the detection means, evaluation of the detected reflections and determination of the width of the gap and the mismatch with the evaluation means.

According to a preferred embodiment, several images are recorded of the line-shaped reflections at the edges of the structural components in rapid time sequence, wherein the recorded images are buffered and the width of the gap and/or the mismatch is determined by evaluation of the images.

In an advantageous manner, the measuring values extracted from the recorded images are filtered and/or statically evaluated. The measuring values extracted from the recorded images are preferably averaged. In addition, the plausibility of the measuring values extracted from the recorded images can be checked. Unplausible measuring values are not taken into consideration for determination of the gap width or mismatch. Measuring values having large deviations can e.g. be sorted out within the scope of the plausibility check.

A preferred embodiment of the present invention is illustrated in more detail below with reference to the drawing.

BRIEF DESCRIPTION OF THE DRAWING

FIG. 3 shows a top view of the device of FIG. 2.

DESCRIPTION OF THE PREFERRED EMBODIMENT

Figure 1:
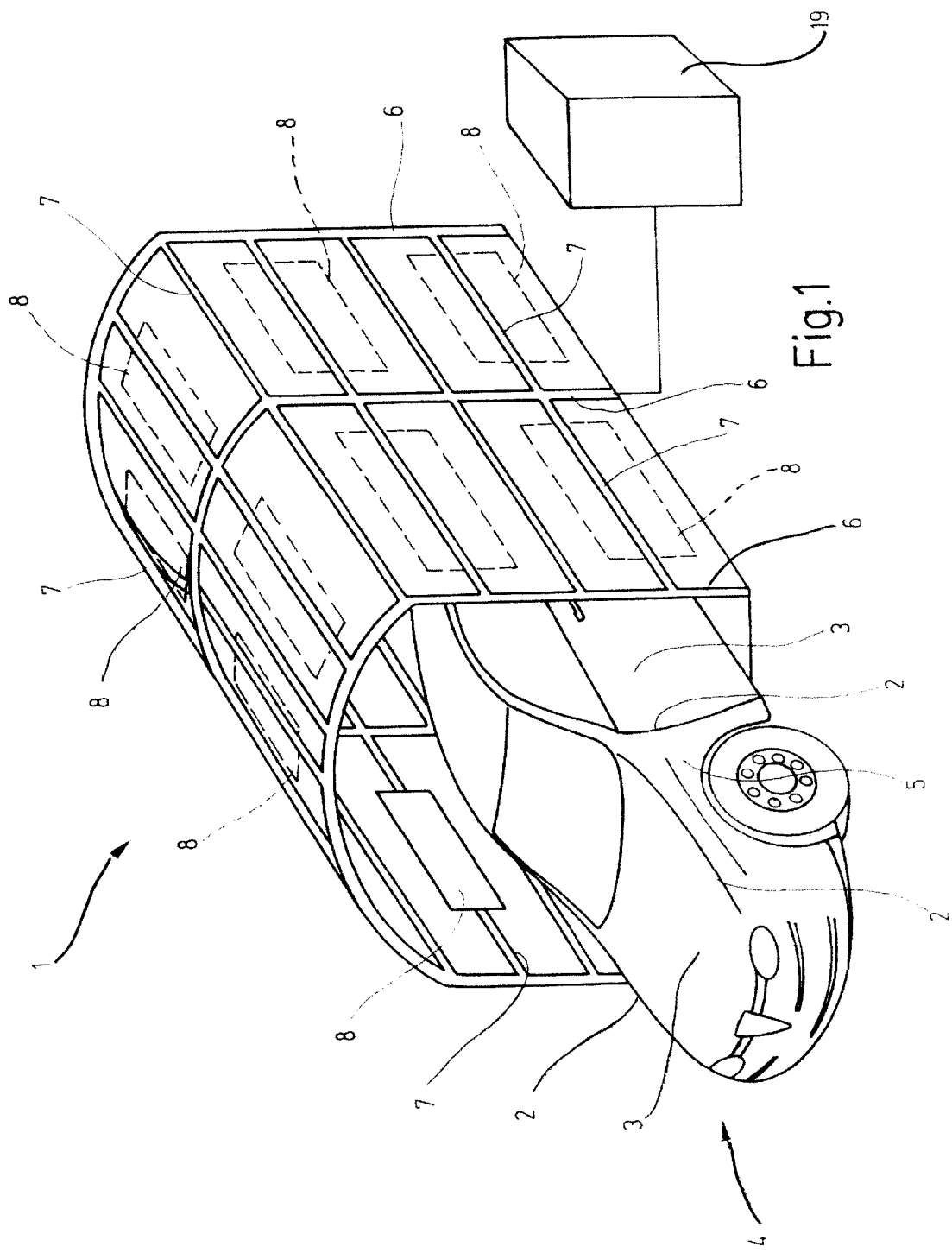
FIG. 1 shows a perspective view of an inventive gap measuring arrangement according to a preferred embodiment.

FIG. 1 illustrates an inventive gap measuring device according to a preferred embodiment, indicated in its entirety by reference numeral 1. The gap measuring device 1 serves for measuring the width b of gaps 2 between leaves 3 of a vehicle 4. The gaps 2 are delimited from both sides by edges 17 of the leaves 3. The gaps 2 can also be delimited on one side by an edge 17 of a leaf 3 and on the other side by the rest of the body 5 of the vehicle 4. In addition to measurement of the gap width b, the inventive gap measuring arrangement 1 can also measure the mismatch v between the two leaves 3 (see FIG. 3).

The gap measuring device 1 comprises a tunnel-like supporting frame with arc-shaped supporting elements 6 and transverse beams 7. The supporting frame 6, 7 is made from aluminium. A plurality of inventive devices 8 for measuring the width b of a gap 2 and the mismatch v between any two structural components are disposed at the inside of the supporting frame 6,7. The structural components in the present embodiment are the leaves 3 of the vehicle 4. FIG. 1 schematically shows the devices 8. Their precise structure is shown in FIGS. 2 and 3.

Figure 2:
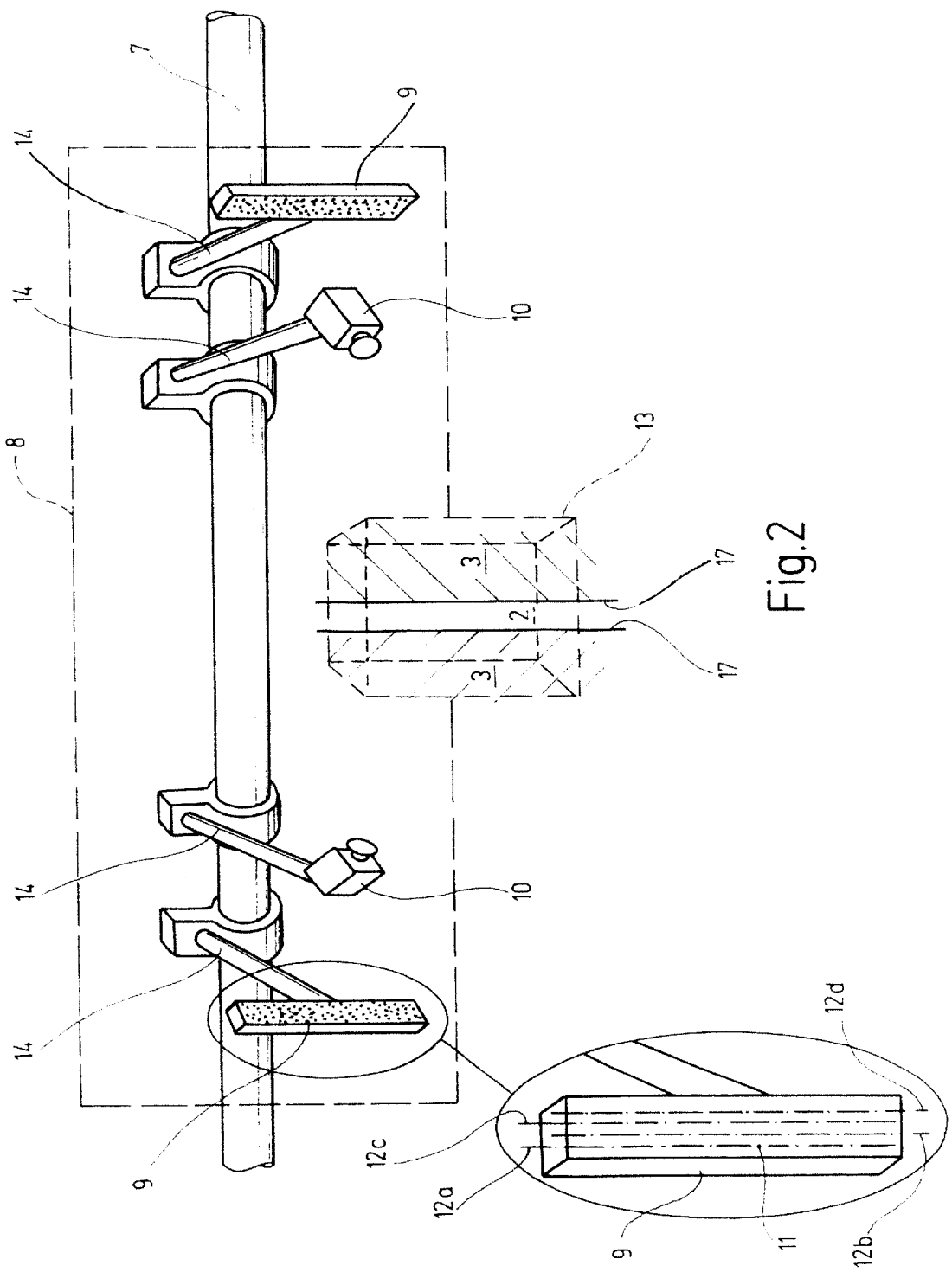
FIG. 2 shows a perspective view of an inventive device for measuring the gap width according to a preferred embodiment.

FIG. 2 shows one of the devices 8 of the gap measuring device 1. It comprises illumination means 9 and two detectors configured as video cameras 10. The illumination means 9 comprise two light sources having a plurality of light emitting diodes (LEDs) 11 (see the section of the illumination means 9 in FIG. 2). The LEDs 11 are disposed in four parallel rows 12a, 12b, 12c, 12d. The LEDs 11 of neighboring rows 12a, 12b ; 12b, 12c ; 12c, 12d are disposed offset from one another. The LEDs 11 of the illumination means 9 emit light in the infrared (IR) range.

A device 8 of this type comprising illumination means 9 and two video cameras 10 is referred to as measuring head arrangement. The illumination means 9 and the video cameras 10 are rigidly positioned within the device 8 and oriented towards a fixed delimited measuring region 13. The measuring region 13 comprises a three-dimensional measuring volume in which the device 8 can carry out a measurement with highest accuracy or in which measurement is possible at all. For carrying out gap measurement, the gap 2 to be measured must be positioned such that it is within the fixed measuring range 13.

The illumination means 9 and the video cameras 10 are mounted to the transverse beams 7 for changing the position and/or the location relative to the gap 2 via manually adjustable hinged arms 14 having at least six degrees of freedom. Alternative to FIG. 2, the illumination means 9 and one or more video cameras 10 can also be combined into an integral structural component which is then mounted to the transverse beam 7 via a hinged arm 14. The hinged arms 14 comprise means for positioning the illumination means 9 and the video cameras 10 at a desired position and location. The transverse beams 7 are releasably mounted to the supporting elements 6 such that they can be easily removed, together with the illumination means 9 and the video cameras 10, from and be re-inserted into the supporting frame 6, 7. The releasable connections between the supporting elements 6 and the transverse beams 7 are designed such that, to a certain extent, the transverse beams 7 automatically assume their position during insertion into the supporting frame 6, 7. Automatic positioning is effected with an accuracy of less than one millimeter. A defective device 8 can be quickly and easily replaced by a new device 8 in view of the detachable connection between the transverse beams 7 and the supporting elements 6. This also allows the illumination means 9 and the video cameras 10 of the device 8 to be positioned and oriented in another supporting frame for use within a given measuring range 13. The fully adjusted and oriented device 8 can then be inserted into the supporting frame 6, 7 in a rapid and simple manner.

FIG. 3 illustrates orientation of the illumination means 9 and the video cameras 10 of the device 8. An imaginary tangential plane 15 extends at the leaves 3 along the gap 2. The measuring range 13 of the device 8 subtends the tangential plane 15. A normal plane 16 extends through the gap 2, perpendicularly to the tangential plane 15. An illumination means 9 and a video camera 10 are arranged on each side of the normal plane 16.

The illumination means 9 are oriented in such a fashion that the light beams 18 emitted by them impinge on the edges 17 of the leaves 3 at an angle α of approximately 45°. The video cameras 10 are oriented such that they can record images of both edges 17 without recording a virtual reflected image of the illumination means 9. This is prevented by disposing them as closely as possible to the illumination means 9. The video cameras 10 are therefore oriented at an angle of slightly more than 45° relative to the tangential plane 15.

The devices 8 of the gap measuring device 1 are connected to evaluation means 19. The evaluation means 19 serve for evaluation of the images of the video cameras 10 and for determining the width b of the gap 2. Each device 8 can have its own evaluation means 19. In the embodiment described herein, all devices 8 of the gap measuring device 1 are connected to a common evaluation means 19. The evaluation means 19 comprise a scalable industrial personal computer (PC) system.

Measurement of the width b of the gap 2 and the mismatch v between the two leaves 3, is done as follows. The illumination means 9 emit light beams 18 onto the edges 17 of the leaves 3 of the vehicle 4. At least a portion of the light beams 18 is reflected from the surface of the leaves 3. The light beams 18 also generate linear reflections at the edges 17 of the leaves 3. The video cameras 10 record two-dimensional images of the gap 2 and the region around the gap 2 (edges 17 and leaves 3). The images record the linear reflections. The evaluation means 19 determine the width b of the gap 2 through evaluation of the images of the video camera 10. The two-dimensional images of the video cameras 10 are superimposed by the evaluation means 19 to form a three-dimensional image. For correct superposition, the two video cameras must be previously calibrated e.g. using a known calibration object.

The evaluation means 19 can determine the mismatch v between the leaves 3 from the three-dimensional image.

The inventive device 8 can properly function regardless of ambient light conditions (e.g. sunlight or artificial light in buildings), when the illumination means 9 emit light beams 18 pulsed at a certain pulsed cycle rate. The video cameras 10 receive the line-shaped reflections at the edges 17 of the leaves 3 at this given pulsed cycle rate. The illumination means 9 and the video cameras 10 operate at the same, synchronized pulsed cycle rate.

The device 8 in accordance with the invention permits, for the first time, contact-free measurement of the width b and the mismatch v of a gap 2 between two structural components. The device 8 works independently of the surface finish (shiny or mat; color of the surface) of the structural components which delimit the gap 2. Moreover, the device 8 permits relative motion between the gap 2 to be measured and the device 8 during the measurement.

In addition to use as described in the present embodiment as a gap measuring arrangement 1 for measuring the width b and the mismatch v of gaps 2 between the leaves 3 of a vehicle 4, the device 8 for measuring the width b and the mismatch v of a gap 2 can also be used for a plurality of other applications.

We claim:

1. A device for measuring a width of a gap between two structural components, the gap being delimited by edges of the structural components, the device comprising:

illumination means for illuminating the structural components;

detecting means for detecting reflections generated by said illumination means on the structural components in an area of the gap; and evaluation means for evaluating said detected reflections and for determining the width of the gap, wherein said illumination means and said detecting means are disposed and oriented with respect to one another and relative to the gap for detection by the detecting means of line-shaped reflections at the edges of the structural components delimiting the gap, said line-shaped reflections extending parallel to said edges of said structural components.

2. The device of claim 1, wherein said illumination means are oriented with respect to the gap for directing light beams from said illumination means to impinge on said edges of the structural components at an illumination angle of <90° relative to an imaginary tangential plane extending tangentially to the structural components at the gap.

3. The device of claim 2, wherein said illumination angle is between 30° and 60°.

4. The device of claim 2, wherein said illumination means illuminate an edge disposed on an opposite side of an imaginary normal plane extending orthogonally to said tangential plane and through the gap.

5. The device of claim 4, wherein said illumination means comprise at least two light sources, at least one of which is disposed on one side of said normal plane and at least one of which is disposed on an opposite side of said normal plane.

6. The device of claim 5, wherein each of said light sources comprises at least one light emitting diode (LED).

7. The device of claim 6, wherein each of said light sources comprises several LEDs, disposed in at least one row.

8. The device of claim 7, wherein each of said light sources comprises several rows of LEDs, wherein LEDs of one row are offset from LEDs of a neighboring row.

9. The device of claim 1, wherein said illumination means emit light in an infrared (IR) range.

10. The device of claim 1, wherein said illumination means emit pulsed light at a pulsed cycle rate.

11. The device of claim 1, wherein said detection means are oriented relative to the gap at a viewing direction intersecting the edges of the structural components at a viewing angle of <90° with respect to an imaginary tangential plane extending tangentially to the structural components at the gap.

12. The device of claim 11, wherein said viewing angle is between 30° and 60°.

13. The device of claim 11, wherein said detection means comprise at least two video cameras at least one of which is disposed on one side of an imaginary normal plane extending orthogonally to said tangential plane and through the gap and at least one of which is disposed on an opposite side of said normal plane.

14. The device of claim 13, wherein each of said video cameras comprises one of a charge-coupled device (CCD) image converter or a CMOS (Complementary Metal Oxide Semiconductor) image converter.

15. The device of claim 13, wherein said evaluation means combine images of said video cameras into a three-dimensional image.

16. The device of claim 1, wherein said detection means record the line-shaped reflections at the edges of the structural components at a pulsed cycle rate.

17. The device of claim 16, wherein said illumination means and said detection means operate at a same, synchronized pulsed cycle rate.

18. The device of claim 1, wherein said evaluation means comprises one of a computer and an industrial PC.

19. The device of claim 1, wherein the device measures the width of the gap in real time.

20. The device of claim 1, wherein said illumination means and at least two video cameras are combined into one measuring head arrangement.

21. The device of claim 20, further comprising means for changing at least one of a position and orientation of said illumination means and said video cameras relative to the gap and means for setting said illumination means and said video cameras to at least one of a desired orientation and a desired position.

22. The device of claim 1, wherein the device is a gap measuring device for measuring the width of a gap between parts of a body vehicle.

23. The device of claim 22, wherein at least one of said parts is hinged to said vehicle.

24. A gap measuring system for measuring a width of gaps between parts of a body of a vehicle, the gaps being delimited by edges of the parts, the system comprising:

a first device disposed proximate the vehicle and directed towards a first gap;

a second device disposed proximate the vehicle and directed towards a second gap, wherein each of said first and said second devices has illumination means for illuminating the parts, detecting means for detecting reflections generated by said illumination means on the parts in an area of said first and said second gap; and evaluation means for evaluating said detected reflections and for determining the width of said first and said second gap, wherein said illumination means and said detecting means are disposed and oriented with respect to one another and relative to said first and said second gap for detection by said detecting means of line-shaped reflections at the edges of the parts delimiting said first and said second gap, said line-shaped reflections extending parallel to said edges of said parts.

25. The gap measuring system of claim 24, further comprising a tunnel-like supporting frame in which said first and said second device are disposed.

26. The gap measuring system of claim 25, wherein the vehicle mores relative to said first and said second devices.

27. The gap measuring system of claim 26, wherein said first and said second devices are mounted in a stationary manner to said supporting frame and the vehicle moves through said supporting frame.

28. The gap measuring system of claim 26, wherein positions of said first and said second devices each have a distance of at least 30 centimeters from the vehicle.

29. The system of claim 28, wherein said distance is approximately 50 centimeters.

30. The gap measuring system of claim 24, wherein said evaluation means of said first and said second devices are combined into a common evaluation unit.

31. The gap measuring system of claim 24, where at least one of said first and said second devices sequentially measures widths of at least two gaps.

32. A method of measuring a width of a gap between two structural components, wherein the gap is delimited by edges of the structural components, the method comprising the steps of:

a) illuminating the structural components with illumination means, b) detecting reflections generated by said illumination means in an area of the gap;

c) evaluating said detected reflections; and d) determining the width of the gap, wherein line-shaped reflections are detected at the edges of the structural components and the width of the gap is determined by evaluation of said detected line shaped reflections, said line-shaped reflections extending parallel to said edges of said structural components.

33. The method of claim 32, wherein a dark/light/dark transition of said line-shaped reflection at the edges of the structural components delimiting the gap is detected.

34. The method of claim 32, wherein a mismatch between the structural components is detected.

35. The method of claim 34, wherein at least one of the width and said mismatch are measured in real time.

36. The method of claim 32, wherein the width of the gap is measured in real time.

37. The method of claim 32, wherein several images of said line-shaped reflections at the edges of the structural components are recorded within a time sequence, wherein said recorded images are buffered and at least one of the width of the gap and a mismatch are detected through evaluation of said buffered images.

38. The method of claim 37, wherein measurement values extracted from said recorded images are at least one of filtered and statistically evaluated.

39. The method of claim 38, wherein said measurement values are checked for plausibility.

40. The method of claim 37, wherein measurement values extracted from said recorded images are averaged.

41. The method of claim 40, wherein said measurement values are checked for plausibility.

* * * * *